April 16, 1957

C. E. BOWERS, JR 2,788,558

DETACHABLE CONNECTION FOR MOUNTING A FACE
PROTECTOR ON A HEAD PROTECTOR

Filed March 10, 1953

INVENTOR.
CHARLES E. BOWERS, JR.
BY Joshua R. H. Potts
HIS ATTORNEY.

United States Patent Office 2,788,558
Patented Apr. 16, 1957

2,788,558

DETACHABLE CONNECTION FOR MOUNTING A FACE PROTECTOR ON A HEAD PROTECTOR

Charles E. Bowers, Jr., Media, Pa., assignor to The Fibre Metal Products Company, Chester, Pa., a corporation of Pennsylvania Application March 10, 1953, Serial No. 341,572

1 Claim. (Cl. 24—222)

The present invention relates to a connection for mounting a face protector such as a welding helmet on a head protector such as a skullguard, and is concerned primarily with a novel connection offering ease of assembly and disassembly at the same time providing security in the mounting.

At the present time, skullguards are commonly worn by workmen while engaged in various operations. On occasions, such workmen also wear welding helmets to protect their faces. Due to the fact that the helmet is not always worn with the skullguard, the practice of employing detachable connections for mounting the helmet on a skullguard has arisen. The important factors in such a connection, are ease of establishing the connection, ease of breaking the connection, and security of the mounting.

With the foregoing conditions in mind, the present invention has in view as its foremost objective, the provision of a detachable connection of the character indicated which satisfies the above outlined conditions to a degree heretofore unattained.

More in detail, the invention has as an object the provision of a detachable connection for mounting a welding helmet on a skullguard which consists essentially of a slide that is intended to be permanently secured to a skullguard and a track member that is attached to the welding helmet. This track member receives the slide and the two are formed with complemental elements of a snap fastener to yieldably maintain the assembled relation.

Another object is to provide, in a detachable connection of the character aforesaid, a slide having a face curved to conform to the contour of the side of the skullguard on which it is to be mounted, and having a recess on its opposite face adapted to receive a projection on the track. This slide has outwardly extending side edge flanges, a central recess for accommodating a rivet, and a pair of projections on the curved face that are adapted to be received in openings in the skullguard to prevent rotative movement of the slide relative thereto.

Still another object of the invention is to provide a track in the form of a bracket having a main body portion that is adapted to be connected to the friction joint that is ordinarily included as a part of a welding helmet and from which main body portion extend side flange terminating in beads which present inwardly opening grooves that receive the side edge flanges of the slide. The main body portion also carries an extension that is formed with a projection which is received in the recess of the slide, and which terminates in an end flange which functions as a stop for limiting movement of the track relative to the slide.

Various other more detailed objects and advantages of the invention, such as arise in connection with carrying out the above noted ideas in a practical embodiment, will in part become apparent and in part be hereinafter stated, as the description of the invention proceeds.

The invention therefore comprises a connection for detachably mounting a welding helmet on a skullguard, and which connection consists essentially of a slide that is adapted to be permanently secured to a skullguard and which is formed with a recess on its outer face. Cooperating with this slide is a track in the form of a bracket that is adapted to be connected to the friction joint of a welding helmet, and which track has side flanges presenting grooves which receive edge flanges on the slide. The track also has a projection that is adapted to be received in the recess in the slide and an end flange which functions as a stop for limiting movement of the track relative to the slide.

For a full and more complete understanding of the invention, reference may be had to the following description and accompanying drawing wherein.

Figure 1:
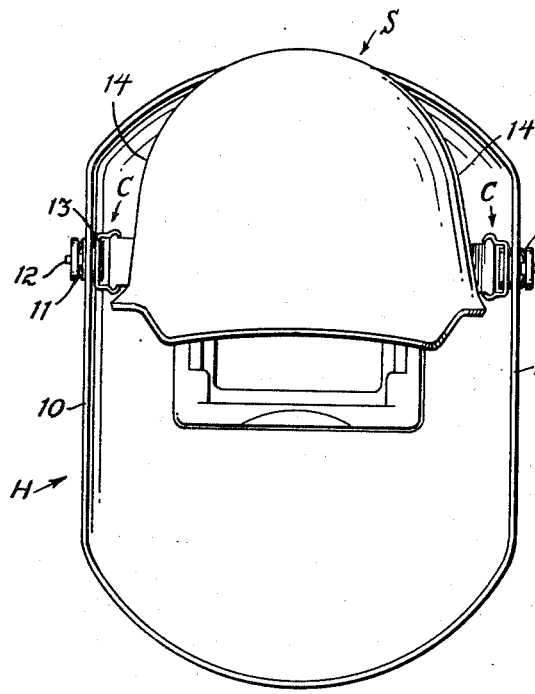
Figure 1 is a view in elevation looking at the inside of a welding helmet that is mounted on a skullguard by a pair of the connections of this invention.
Figure 2:
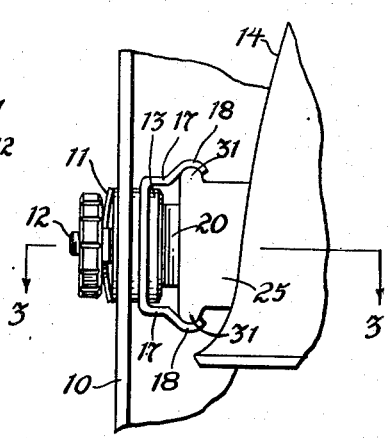
Figure 2 is a detailed view taken on an enlarged scale on the plane of Figure 1 illustrating the connection at one side.

Referring now to the drawing wherein like reference characters denote corresponding parts and first more particularly to Figure 1, a welding helmet is therein illustrated and referred to in its entirety by the reference character H. The helmet H includes two flat side walls 10, each of which carries a friction joint 11. The detailed construction of the friction joint 11 is not a part of the present invention, because such friction joints are now well known in the art and available as such. It is sufficient to point out that each friction joint 11 includes a bolt 12 that terminates on the inner side of the wall 10 in a head 13 which serves to maintain the track assembled with the friction joint as will be later pointed out.

A skullguard is designated S. This skullguard includes two curved sides 14 which extend down over the sides of the head of a wearer. The particular construction of this skullguard S is also not the part of the present invention. Such skullguards are now widely used in the various construction industries and ordinarily comprise the hard outer shell which is illustrated in the drawing, and which is mounted in spaced relation with respect to the head of a wearer by a headgear (not illustrated).

The welding helmet 11 is mounted on the skullguard S by a pair of connections C, therebeing one of these connections C between each side wall 10 of the helmet and the adjacent side 14 of the skullguard.

Figure 4:
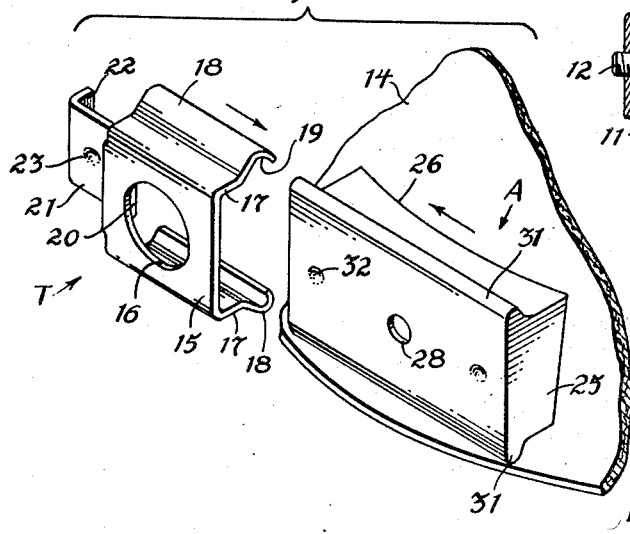
Figure 4 is a perspective view illustrating the slide and track in exploded relation.

Referring now more particularly to Figure 4, a connection C is shown as comprising a track T and a slide A. The track T takes the form of a metallic bracket having a flat main body portion 15 that is formed with an opening 16 which receives the bolt 12, with the head 13 bearing against the inner face of the body portion 15, to maintain the track T assembled with the friction joint 11.

Extending inwardly from the side edges of the main body portion 15 are a pair of side flanges 17 which terminate in beads 18, which present inwardly opening grooves 19. Also, extending inwardly from this main body portion 15 is an end flange 20 (see Figure 3) and extending outwardly from the inner end of this flange 20 is an extension 21 that has its end portion turned inwardly to form a stop 22. The extension 20 is deformed as indicated at 23 to provide an inwardly extending projection 24 (see Figure 3) for a purpose to be later described.

The slide A is preferably made of a fibrous composition which is now meeting with widespread use in the manufacture of welding helmets, skullguards and similar head protecting equipment. This slide A comprises a main body portion 25 having an inner curved face at 26 which conforms to the curvature of the side 14 of the skullguard S. Thus, the slide A is adapted to be snugly fitted over the side 14 of the skullguard. Extending through this main body portion 25 is a passage 27 that is designed to accommodate a rivet as will be later pointed out, and this passage 27 terminates in a countersink at 28 on the outer face of the slide. The main body portion 25 is also formed with a pair of projections 29 which are disposed on opposite sides of the opening 27, and which projections are adapted to be received in the openings 30 that are formed in the side 14 of the skullguard.

Extending outwardly from the side edges of the main body portion 25 at the top, are two side flanges 31 which are curved to conform to the curvature of the beads 18 whereby, they are adapted to be received in the grooves 19 that are formed by these beads. The outer face of the slide A is substantially flat and is formed with a recess or depression 32 into which the projection 24 is designed to fit with a snap action.

Figure 3:
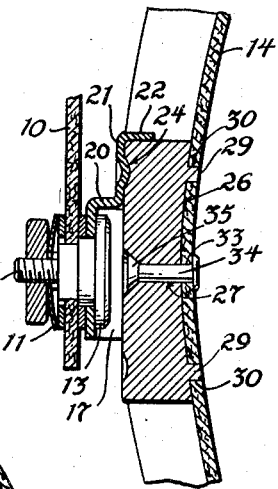
Figure 3 is a horizontal section taken about on the plane represented on the line 3—3 of Figure 2.

Referring now more particularly to Figure 3, the slide A of the skullguard S is shown with the openings 30 receiving the projections 29. In this position the passage 27 aligns with another opening 33 that is formed in the side 14. A rivet 34 passes through the aligned passage 27 and opening 33 and has a head 35 that is positioned in the countersink 28 below the level of the outer face of this slide.

*Operation*

While the manner of using the detachable connection of this invention is believed to be ovious from the illustration of the drawing and description of parts given it may be briefly outlined as follows:

A pair of slides A are first permanently assembled on the outer face of the two sides 14 of the skullguard S. A pair of the tracks T are also assembled with the two friction joints 11 which are included as a part of the welding helmet H. When it is desired to mount the helmet H on the skullguard S, the operator aligns the track T relative to the slides A whereupon, the helmet and skullguard are moved together so that the slides enter the tracks. As this action takes place, the side edge flanges 31 will be received in the grooves 19. This movement is continued until the projection 24 snaps into the recess 32, and the stop 22 engages the end of the slide A.

The welding helmet is now mounted on the skullguard S in a secure manner and the helmet may be swung on the friction joints 11 as pivots in the usual manner.

When it is desired to break the connections C to disassemble the helmet from the skullguard, all that is necessary is to supply a sufficient force to cause the projections 24 to ride out of the recesses 32. This action may be aided by the operator engaging the free edge of the stop 22 so as to move the extension 21 outwardly, and thus withdraw the projection 24 from the recess 32. Once the projection 24 is clear of the recess, but little effort is required to remove the track from the slide.

While a preferred specific embodiment of the invention is hereinbefore set forth, it is to be clearly understood that the invention is not to be limited to the exact constructions, mechanisms, and devices illustrated and described because various modifications of these details may be provided in putting the invention into practice within the purview of the appended claim.

What is claimed is:

In a detachable connection of the character described, a track comprising a main body portion formed with an opening adapted to receive the bolt of a friction joint that is included as a part of the welding helmet, side flanges extending inwardly from and integrally joined to said main body portion, a head on each of said side flanges presenting an inwardly opening groove with the grooves in confronting relation, a resilient extension extending outwardly from one end of said main body portion, and end flange on said extension, and a slide adapted to be permanently mounted on a skullguard, side flanges on said slide adapted to be snugly received in said grooves, and complemental elements of a detent snap fastener on said extension and slide respectively, said snap fastener elements being susceptible of separation due to the resiliency of said extension.

References Cited in the file of this patent

UNITED STATES PATENTS

| 166,364 | Hartwell | Aug. 3, 1875 |
| 662,676 | Maynz | Nov. 27, 1900 |
| 790,223 | Nichols | May 16, 1905 |
| 1,271,530 | Cerpial | July 2, 1918 |
| 2,028,020 | Sheldon | Jan. 14, 1936 |
| 2,447,083 | Moeller | Aug. 17, 1948 |
| 2,578,171 | Bub | Dec. 11, 1951 |

FOREIGN PATENTS

| 113,315 | Australia | June 13, 1941 |
| 339,529 | Germany | July 27, 1921 |
| 612,204 | Great Britain | Nov. 10, 1948 |